(12) United States Patent
Wang et al.

(10) Patent No.: US 8,589,621 B2
(45) Date of Patent: Nov. 19, 2013

(54) OBJECT PERSISTENCY

(75) Inventors: Qing F. Wang, Beijing (CN); Yun Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 183 days.

(21) Appl. No.: 13/192,347

(22) Filed: Jul. 27, 2011

(65) Prior Publication Data

US 2012/0110254 A1 May 3, 2012

(30) Foreign Application Priority Data

Oct. 29, 2010 (CN) .......................... 2010 1 0524777

(51) Int. Cl.
*G06F 12/00* (2006.01)
*G06F 13/00* (2006.01)
*G06F 13/28* (2006.01)

(52) U.S. Cl.
USPC ........................................................ 711/104

(58) Field of Classification Search
None
See application file for complete search history.

(56) References Cited

U.S. PATENT DOCUMENTS

| | | | |
|---|---|---|---|
| 6,032,153 A | 2/2000 | Sadiq et al. | |
| 7,035,987 B2 | 4/2006 | Rudelic | |
| 7,542,977 B2 | 6/2009 | Hudson et al. | |
| 2004/0078623 A1 | 4/2004 | Totolos, Jr. | |
| 2006/0212644 A1 | 9/2006 | Acton et al. | |
| 2008/0021934 A1* | 1/2008 | Hudson et al. | 707/203 |
| 2008/0096671 A1 | 4/2008 | Gagner et al. | |
| 2008/0270811 A1 | 10/2008 | Chow et al. | |
| 2009/0240664 A1 | 9/2009 | Dinker et al. | |
| 2011/0145476 A1* | 6/2011 | Hulbert et al. | 711/103 |

OTHER PUBLICATIONS

Ahmed, S., "Java Data Objects (JDO): An Object-based Approach to Transparent Persistence", [online], [Retrieved on May 17, 2011]. Retrieved from the Internet at <URL: http://www.devx.com/dbzone/Article/16406/1954>, Total 4 pp.

Condit, J., E.B. Nightingale, C. Frost, E. Ipek, B. Lee, D. Burger, and D. Coetzee, "Better I/O Through Byte-Addressable, Persistent Memory", © 2009 ACM, Total 14 pp.

Grossman, D., "The Transactional Memory/Garbage Collection Analogy", © 2007 ACM, Total 12 pp. (Also at: <URL: http://www.cs.washington.edu/homes/djg/papers/analogy_oopsla07.pdf>.).

Riley, N. and C. Zilles, "Hardware Transactional Memory Support for Lightweight Dynamic Language Evolution", OPSLA'06 Oct. 22-26, 2006, Portland, Oregon, USA, ACM, Total 11 pp. (Also at: <URL: http://web.sabi.net/nriley/pubs/dls6-riley.pdf>.).

Sysnetics, Inc., "Persistence of Distributed Objects", [online], [Retrieved on May 17, 2011]. Retrieved from the Internet at <URL: http://www.sysnetics.com/persist/persistence.html>, Total 13 pp.

* cited by examiner

*Primary Examiner* — Michael Alsip
(74) *Attorney, Agent, or Firm* — Janaki K. Davda; Konrad, Raynes, Davda & Victor LLP

(57) ABSTRACT

There is provided a method and computer system for object persistency that includes: running a program; storing an object of the program into a random access memory in response to determining that the object is a non-persistent object; and storing the object into a phase change memory in response to determining that the object is a persistent object. The method and computer system of the present disclosure do not need separate persistency layers, such that the programming model is light weighted, the persistency of object data is more simple and fast, and implicit transaction process is supported, thereby a great deal of development and runtime costs are saved.

14 Claims, 1 Drawing Sheet

OBJECT PERSISTENCY

CROSS-REFERENCE TO RELATED FOREIGN APPLICATION

This application is a non-provisional application that claims priority benefits under Title 35, Unites States Code, Section 119(a)-(d) from Chinese Patent Application having China Patent Application No. 201010524777.X, filed on Oct. 29, 2010, by Qing F. Wang and Yun Wang, which application is incorporated herein by reference in its entirety.

TECHNICAL FIELD

The present disclosure relates to technical fields of electronic computation, data storage, and object-oriented program design and so on.

BACKGROUND

Currently, object-oriented program design dominates all methods of program design. In the field of object-oriented program design, an object refers to an entity that has a state and a set of operations defined on the state. The state is represented as a set of object attributes. The set of operations associated with the object provide other objects (clients) which request services when requiring some computation with the requested services. Object classes are used to create objects. An object class definition serves as a template for objects which includes declarations of all attributes and services associated with an object of the class. Object persistency means that an object is stored into storage such that the object will not be lost even when power is down. In a JVM (Java Virtual Machine), an object is generally stored into a RAM heap which is volatile, that is, the object data stored in the RAM heap will be lost when the RAM heap is powered-down. Java is a trademark or registered trademark of Oracle and/or its affiliates in the United States, other countries, or both.

An application usually needs to persist some, but not all, objects. Such persistency needs to go through a separate persistency layer. For example, a database usually includes a data portion and an interface such as an API (Application Programming Interface) which can be considered as the persistency layer. During exterior programming to access the database, in addition to statements for normal operations, the specific statements for persisting object data via the API are needed to be written. If such programming work is to be done for each of different databases, the workload is extremely enormous, and it is time consuming, exacting and error-prone. Thus, current object persistency methods and systems need separate persistency layers, heavy weight programming models, and high development and runtime costs.

On the other hand, there has appeared PCM (Phase Change Memory). The PCM has characters in that it is data-nonvolatile and can be addressed according to bytes, which results in the storing speed of the PCM being very fast, and the PCM can be used as working memory (RAM) of CPU, and data can be stored persistently in the meantime.

SUMMARY

According to one aspect of the present disclosure, there is provided a method for object persistency, comprising steps of: running a program; storing an object of the program into a random access memory in response to determining that the object is a non-persistent object; and storing the object into a phase change memory in response to determining that the object is a persistent object.

According to another aspect of the present disclosure, there is provided a computer system, comprising: a processor which processes an object of a running program; a random access memory which stores the object in response to the processor determining that the object is a non-persistent object; and a phase change memory which stores the object in response to the processor determining that the object is a persistent object.

With the method and computer system of the present disclosure, a separate persistency layer is no longer needed such that a programming model is light weighted, the persistency of object data is more simple and fast, and implicit transaction process is supported, thereby a great deal of development and runtime costs are saved.

BRIEF DESCRIPTION OF THE DRAWINGS

These and/or other aspects and advantages of the present disclosure will become more apparent and more easily understood from detailed description of embodiments of the present disclosure in combination with the attached drawings, in which.

DETAILED DESCRIPTION

In the following, some specific embodiments of the present disclosure will be described in detail with reference to the attached drawings. If the detailed description of some related art may confuse the main points of the disclosure, the detailed description thereof will not be provided here. In respective embodiments, identical reference numbers are used to denote elements or units performing the same functions.

Figure 1:
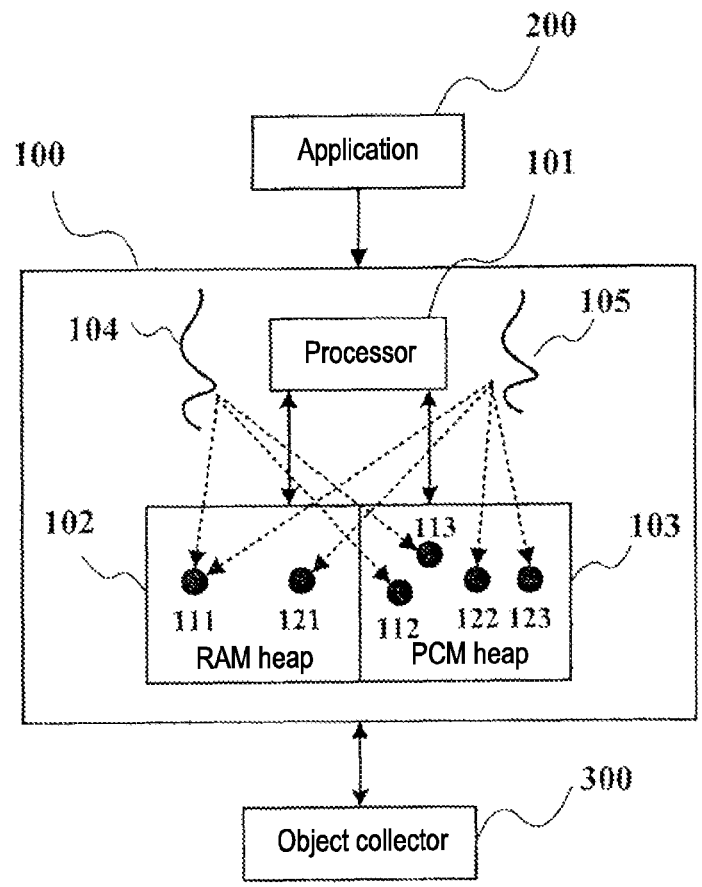
FIG. 1 is a block diagram showing a computer system for object persistency according to the present disclosure.

FIG. 1 is a block diagram showing a computer system for object persistency according to the present disclosure.

In FIG. 1, the reference number 100 is used to represent the computer system for object persistency of the present disclosure. The computer system 100 includes a RAM (Random Access Memory) heap 102 and a PCM (Phase Change Memory) heap 103 both of which are used herein as heaps (memories) for storing objects, wherein the RAM heap 102 is for volatile storage and the PCM heap 103 is for non-volatile storage. It can be seen from FIG. 1 that Java threads (applications) 104 and 105 are run in the computer system 100 respectively. The computer system 100 of FIG. 1 may further include a processor (or interpreter) 101. Objects of the thread 104 or 105 are processed by the processor 101 of the computer system 100, and they are stored into the RAM heap 104 or the PCM heap 105 based on conditions.

Specifically, taking the thread 104 as an example, the processor 101 stores the object 111 in the thread 104 into the RAM heap 102 in response to judging that the object 111 does not need persistency, and stores the objects 112 and 113 in the thread 104 into the PCM heap 103 in response to judging that the objects 112 and 113 need persistency. The object 111 stored in the RAM heap 102 may further be called by other threads such as the thread 105. Also, for the thread 105, the respective objects 111/121 and 122/123 thereof can be stored into the RAM heap 102 and the PCM heap 103, respectively. Specifically, the processor 101 stores the objects 111 and 121 in the thread 105 into the RAM heap 102 in response to judging that the objects 111 and 121 do not need persistency, and stores the objects 122 and 123 in the thread 105 into the PCM heap 103 in response to judging that the objects 122 and 123 need persistency. Since the PCM heap 103 not only can be accessed quickly, but also has a volatile feature, the purpose of persistency in the course of processing can be achieved.

That is to say, the computer system 100 for object persistency provided by the present disclosure may include: the processor 101, which processes an object of a running program; the RAM 102, which is used to store the object in response to the processor 101 judging that the object is a non-persistent object; and the PCM 103, which is used to store the object in response to the processor 101 judging that the object is an object which needs persistency.

In addition to integration application of PCM on a physical machine, as shown in FIG. 1, according to one embodiment of the present disclosure, the computer system 100 may be implemented as a JVM (Java Virtual Machine). One highly important feature for an interpreted programming language (for example, Java) is independence of a platform. Use of a JVM is the key of achieving the feature. If a general advanced language is to be run on different platforms, it needs to be compiled into different target codes. However, after the JVM is introduced, the Java language does not need to be recompiled when running on different platforms. The usage mode of the Java language allows the JVM to shield information on specific platforms, such that a Java language interpreter only needs to generate target codes (byte-codes) running on the JVM so as to run on various platforms without modification. When executing byte-codes, the JVM interprets the byte-codes into machinery instructions on specific platforms to be executed. Therefore, since the present disclosure aims to the object persistency problem for object-oriented interpreted programming languages, the JVM can be selected as the target machine for PCM application in combination with the cross-platform feature of the JVM.

The reference number 200 represents all kinds of applications, which can be run in the computer system 100 (for example, a JVM or interpreter therein), according to the present disclosure, in which one application is, for example, the following program example:

```
Class Student // One example
{
    //_bP =true, the instance is set as persistency
    public Boolean _bP;
    //_bT =true, the instance is set as the transaction state
    public Boolean _bT;
}
```

In the above exemplary program, two attribute indicators are used to define object classes, wherein a transaction indicator bT is used to define whether or not the instance is involved in one transaction process, and a persistency indicator _bP is for defining whether or not the instance needs persistency. That is to say, the persistency indicator _bP is set to represent whether or not the object is an object that needs persistency, and the transaction indicator _bT is used to represent whether or not the object belongs to a certain transaction process.

In the above exemplary program, when the object is determined to need persistency, that is, when the persistency indicator _bP is true, the object is stored persistently, that is, into the PCM heap 103, otherwise, it is stored into the RAM heap 102. When the object is determined to be one object in a certain transaction, that is, the transaction indicator _bT is true, the object is set as a transaction process mode.

The present disclosure supports the transaction process mode. A transaction is a program executing unit which accesses and possibly updates various data items in a database, and it is usually caused by execution of a user program written with an advanced database manipulation language or a programming language (for example, Java) and is delimited by statements like "begin transaction" and "end transaction" (or a function call). A transaction is composed of all operations performed between "begin transaction" and "end transaction". A transaction is a basic unit for resuming and concurrently controlling and has attributes such as atomicity, consistency, isolation, persistence and so on.

A specific form of expression for a transaction programming model of the present disclosure may be for example as follows:

```
ObjA._bT = ObjB._bT = true      // transaction process begins
ObjA.Update( );
ObjB.Update( );
ObjA._bT = ObjB._bT = false     // transaction process ends
```

Here, ObjA and ObjB are two related objects in the transaction, and updating thereof requires to be successful together or unsuccessful together. In the present disclosure, in order to achieve a simplified transaction programming model as described above, an enhanced Java interpreter (for example, the processor 101) needs to do the logical actions as follows:

```
ObjA._bT = ObjB._bT = true // begin transaction, the object is copied
                              into the RAM heap
ObjA.Update( ); // the copied object ObjA is updated
ObjB.Update( ); // the copied object ObjB is updated
ObjA._bT = ObjB._bT = false // end transaction, the copied object _bT
                              is set as false.
```

The reference number 300 represents an object collector. An object collection mechanism refers to a mechanism that the computer system 100 uses to release memories occupied by those objects which are no longer used, and, thus, is also called a garbage collection mechanism. The Java language does not require a JVM to have an object collector and does not specify how the object collector works either. However, common JVMs all have object collectors, and most object collectors use similar algorithms to manage memories and to perform operations of collection. The purpose of object collection is to clear away objects which are no longer used. The object collector determines whether to collect an object or not by determining whether the object is referred by an active object or not.

The object collector 300 of the present disclosure carries out the following logical operations to expand the object collector so as to achieve object access transfer between the RAM heap 102 and the PCM heap 103, that is, to support transaction persistency.

(1) if _bT is T (True), indicating that the object belongs to a certain transaction process, the object collector 300 performs no special processing on the object, and, instead, performs directly a normal flow of the object collector itself;

(2) if _bT is F (False), indicating that the object does not belong to a certain transaction process, the object collector 300 further determines the attributes of _bP for the object, (2.1) if _bP of the object is T (True), indicating that the object needs persistency, the object collector 300 moves the object to the PCM heap 103 and performs conflict detection (transaction concurrency support);

(2.2) if _bP of the object is F (False), indicating that the object does not need persistency, the object collector 300 moves the object to the RAM heap 102 and goes into a normal object collection flow (detection collection).

The operations of the processor 101 and the object collector 300 of the present disclosure may be shown as the following table:

| _bP | _bT | Heap | The operation of processor | The operation of object collector |
|---|---|---|---|---|
| T | T | PCM | Copy the object into the RAM, update the copied object | |
| T | F | PCM | | Move the object to the PCM, conflict detection |
| F | T | RAM | Copy the object into the RAM, update the copied object | |
| F | F | RAM | | Move the object to the RAM, object collection |

In the object collector 300, it is determined whether the RAM heap 102 or the PCM heap 103 is used by using the above two attribute indicators _bT and _bP and the transaction process between the RAM heap 102 and the PCM heap 103 is supported.

When the attribute indicator _bT of the object is set as T (True), it indicates that the object belongs to a certain transaction process, and the object collector 300 does not operate on the object, instead, the processor 101 copies the object into the RAM heap 102 and updates the copied object, that is, performs an update process. When the attribute indicator _bT of the object is set as F (False), if the attribute indicator _bP of the object is set as T (True), it indicates that the object does not belong to a certain transaction process and needs persistency; at this time, the processor 101 does not operate, instead, the object collector 300 moves the object to the PCM heap 103 and performs conflict detection (transaction concurrency process). When the attribute indicator _bT of the object is set as F (False), if the attribute indicator _bP of the object is set as F (False) too, it indicates that the object does not belong to a certain transaction process and does not need persistency either, at this time, and the processor 101 does not operate, instead, the object collector 300 moves the object to the RAM heap 102 and performs an object collection process. The processor 101 and the object collector 300 according to the present disclosure may be implemented as identical or different machines, and the object collector 300 may be implemented in the computer system 100 for object persistency.

Figure 2:
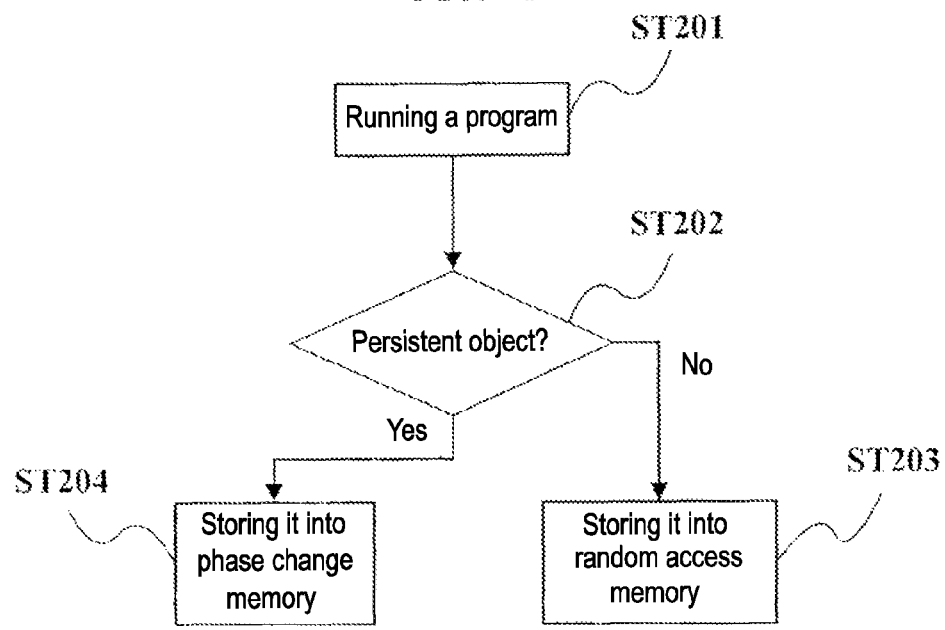
FIG. 2 is a flow chart showing a method for object persistency according to the present disclosure.

FIG. 2 is a flow chart showing a method for object persistency according to the present disclosure.

As shown in FIG. 2, a method for object persistency according to the present disclosure includes the following steps. At step ST201, a program, which may be various object-oriented applications, is run in the computer system 100 as shown in FIG. 1. At step ST202, it is determined whether or not the object is an object which needs persistency. At step ST203, the object is stored into a RAM in response to determining that the object of the program is a non-persistent object. At step ST204, the object is stored into a PCM in response to determining that the object is a persistent object.

The respective steps as described above may be carried out by the processor 101 or other components or units in the computer system 100 as shown in FIG. 1. The method for object persistency according to the present disclosure may further include the step of setting a persistency indicator to indicate whether or not the object is a persistent object and setting a transaction indicator to indicate whether or not the object belongs to a transaction process.

The method for object persistency according to the present disclosure may further include the step of moving the object to the RAM and performing a clearing process when the transaction indicator indicates that the object does not belong to a transaction process and the persistency indicator indicates that the object is a non-persistent object.

The method for object persistency according to the present disclosure may further include the step of moving the object to the PCM and performing conflict detection when the transaction indicator indicates that the object does not belong to a transaction process and the persistency indicator indicates that the object is a persistent object.

The method for object persistency according to the present disclosure may further include the step of copying the object to the RAM and performing update process when the transaction indicator indicates that the object belongs to a transaction process.

The above embodiments of the present disclosure may be implemented by hardware, software and firmware or in a combination thereof, and the way of implementation is not limiting the scope of the present disclosure. For example, the present disclosure may be carried out by executing software programs according to the disclosure in a general purpose computer system.

The above embodiments of the present disclosure are only exemplary description, and their specific structures and operations are not limiting the scope of the disclosure.

Those skilled in the art can combine different parts and operations in the above respective embodiments to produce new implementations which equally accord with the conception of the present disclosure.

The connection relationships between respective functional elements (units) in the embodiments of the present disclosure are not limiting the scope of the present disclosure, in which one or multiple functional element(s) or units may contain or be connected to any other functional elements or units.

Although several embodiments of the present disclosure has been shown and described in combination with the attached drawings above, those skilled in the art should understand that various variations and modifications which still fall into the scope of claims and their equivalents of the present disclosure can be made to these embodiments without departing from the spirit and principle of the disclosure.

What is claimed is:

1. A method for object persistency, comprising:
    running, using a processor of a computer system, a program;
    setting a transaction indicator to indicate whether an object of the running program belongs to a transaction process;
    in response to determining that the object is a non-persistent object and that the transaction indicator indicates that the object does not belong to a transaction process, moving the object into a random access memory; and performing a clearing process; and
    in response to determining that the object is a persistent object, storing the object into a phase change memory.

2. The method according to claim 1, further comprising:
setting a persistency indicator to indicate whether the object is a persistent object.

3. The method according to claim 2, further comprising:
in response to determining that the transaction indicator indicates that the object does not belong to a transaction process and the persistency indicator indicates that the object is a persistent object,
moving the object to the phase change memory; and
performing a conflict detection.

4. The method according to claim 2, wherein the object is copied to the random access memory and further comprising:
in response to determining that the transaction indicator indicates that the object belongs to a transaction process, performing an update process.

5. The method according to claim 4, wherein the persistency indicator indicates one of that the object is a persistent object and that the object is a non-persistent object.

6. The method according to claim 1, wherein the running program comprises an object-oriented application.

7. The method according to claim 1, wherein the running program comprises a virtual machine.

8. A computer system, comprising:
a processor that processes an object of a running program;
a transaction indicator that is set to indicate whether the object belongs to a transaction process;
a random access memory coupled to the processor, wherein the object is moved into the random access memory in response to the processor determining that the object is a non-persistent object and that the transaction indicator indicates that the object does not belong to a transaction process;
a phase change memory coupled to the processor, wherein the phase change memory stores the object in response to the processor determining that the object is a persistent object; and
an object collector that moves the object to the random access memory and performs a clearing process.

9. The computer system according to claim 8, wherein a persistency indicator is set to indicate whether the object is a persistent object.

10. The computer system according to claim 9, wherein the object collector that moves the object to the phase change memory and performs a conflict detection in response to determining that the transaction indicator indicates that the object does not belong to a transaction process and the persistency indicator indicates that the object is a persistent object.

11. The computer system according to claim 9, wherein the processor copies the object to the random access memory and performs an update process in response to determining that the transaction indicator indicates that the object belongs to a transaction process.

12. The computer system according to claim 11, wherein the persistency indicator indicates one of that the object is a persistent object and that the object is a non-persistent object.

13. The computer system according to claim 8, wherein the running program comprises an object-oriented application.

14. The computer system according to claim 8, wherein the running program comprises a virtual machine.

* * * * *